United States Patent
Lin

(10) Patent No.: US 8,313,204 B2
(45) Date of Patent: Nov. 20, 2012

(54) BACKLIGHT MODULE AND KEYBOARD

(75) Inventor: Chin-Hung Lin, Yonghe (TW)

(73) Assignee: Darfon Electronics Corp., Gueishan, Taoyuan (TW)

( * ) Notice: Subject to any disclaimer, the term of this patent is extended or adjusted under 35 U.S.C. 154(b) by 749 days.

(21) Appl. No.: 12/552,343

(22) Filed: Sep. 2, 2009

(65) Prior Publication Data

US 2010/0051429 A1    Mar. 4, 2010

(30) Foreign Application Priority Data

Sep. 3, 2008   (TW) ............................... 97215884 U

(51) Int. Cl.
*G01D 11/28* (2006.01)
*F21V 7/04* (2006.01)

(52) U.S. Cl. ............................ 362/26; 362/600; 362/606

(58) Field of Classification Search .................. None
See application file for complete search history.

(56) References Cited

U.S. PATENT DOCUMENTS 7,384,179 B2 *   6/2008  Sakai ............................ 362/632
8,058,977 B2 * 11/2011  Lynam ........................ 340/425.5

\* cited by examiner

*Primary Examiner* — Natalie Walford
(74) *Attorney, Agent, or Firm* — Winston Hsu; Scott Margo

(57) ABSTRACT

The invention provides backlight module comprising a light guiding plate, a flexible substrate, and a light emitting unit. The flexible substrate has a first surface, and the light emitting unit is configured on the first surface. A paint area used for reflecting the light, emitted by the light emitting unit, to the light guiding plate is formed on the first surface near the light emitting unit. Accordingly, the light emitted into the light guiding plate could be prevented from being reflected by the flexible substrate directly and presenting the same color with the flexible substrate.

19 Claims, 5 Drawing Sheets

BACKLIGHT MODULE AND KEYBOARD

BACKGROUND OF THE INVENTION

1. Field of the Invention

The present invention relates to a backlight module and a keyboard comprising the same. Particularly, the invention relates to a backlight module which can completely display the color of the light emitted from a light emitting unit, and a keyboard comprising the same.

2. Description of the Prior Art

Generally speaking, a backlight module of a light-emitting keyboard includes a light guiding plate for guiding the light emitted from a light emitting element all over the light guiding plate and for reflecting the light to the operation surface of the keyboard. Accordingly, users can observe the light emitted from the light guiding plate and have a vision effect.

Please refer to FIG. 1. FIG. 1 is a schematic diagram illustrating a backlight module 1 of a light-emitting keyboard according to prior art. As shown in FIG. 1, the backlight module 1 comprises a light emitting element 10, a flexible substrate 12 and a light guiding plate 14. The light emitting element 10 is disposed on the flexible substrate 12 and is controlled by the flexible substrate 12. The light emitted from the light emitting element 10 is irradiated to the light guiding plate 14 and is conducted in the light guiding plate 14. The light guiding plate 14 further comprises a reflecting patch or a reflecting structure (not shown in FIG. 1), disposed at the bottom of the light guiding plate 14, for reflecting the light from the light guiding plate 14 to the keyboard, so that users can observe the light emitted from the light guiding plate and have a vision effect.

However, because the color of the flexible substrate is different from that of the light emitted from the light emitting element (for example, light emitting diode) of the light-emitting keyboard, the flexible substrate can only reflect the light with the same color thereof to the light guiding plate. Therefore, the color of the light provided by the part of the light guiding plate near the light emitting element is easily be affected by the flexible substrate. For a designer's consideration, the light reflected by the flexible substrate to the light guiding plate will generate a bad influence for the vision effect of the light-emitting keyboard, especially that the larger keyboard needs more light emitting units, and then increases the degree of bad vision effect. Therefore, how to improve the influence of the flexible substrate to the light-emitting keyboard becomes one of the research points of the backlight module.

SUMMARY OF THE INVENTION

Accordingly, an aspect of the present invention is to provide a backlight module for solving aforementioned problem.

According to an embodiment, the backlight module of the present invention comprises a light guiding plate, a flexible substrate and a light emitting unit. The flexible substrate has a first surface, and the light emitting unit is disposed on the first surface. A paint area is formed on the first surface near the light emitting unit for reflecting the light emitted from the light emitting unit to the light guiding plate.

In the embodiment, the paint area is formed on the first surface near an outlet of the light emitting unit, so as to reflect the light emitted from the outlet of the light emitting unit to the light guiding plate. In practice, the paint area is formed of white paint or white ink.

According to another embodiment, a keyboard of the invention includes a keyboard module and a backlight module, wherein the backlight module is disposed under the keyboard module as a light source to the keyboard module. The backlight module further includes a light guiding plate, a flexible substrate and a light emitting unit. The light guiding plate is disposed under the keyboard module, and the light guiding plate has a space. The flexible substrate has a first surface. The light emitting unit is disposed on the first surface. Moreover, the light emitting unit is also contained in the space. Particularly, a paint area is formed on the first surface near the light emitting unit for reflecting the light emitted from the light emitting unit to the light guiding plate.

As mentioned above, the paint area is formed on the first surface near an outlet of the light emitting unit, so as to reflect the light emitted from the outlet of the light emitting unit to the light guiding plate. In practice, the paint area is formed of white paint or white ink.

The objective of the present invention will no doubt become obvious to those of ordinary skill in the art after reading the following detailed description of the preferred embodiment, which is illustrated in following figures and drawings.

BRIEF DESCRIPTION OF THE APPENDED DRAWINGS

DETAILED DESCRIPTION OF THE INVENTION

Figure 1:
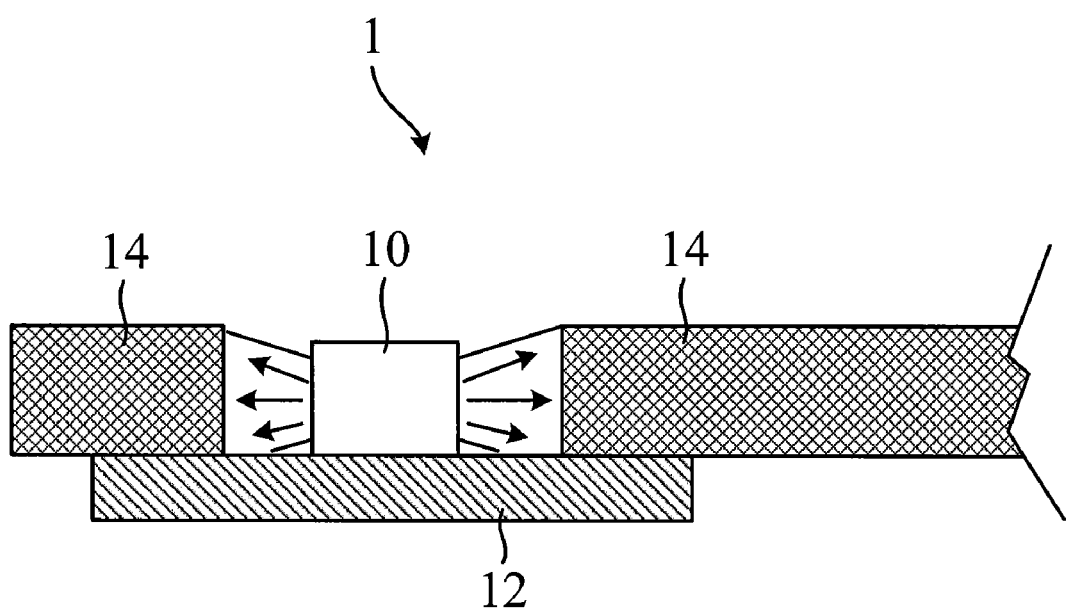
FIG. 1 is a schematic diagram illustrating a backlight module applied to a light-emitting keyboard according to prior art.
Figure 2:
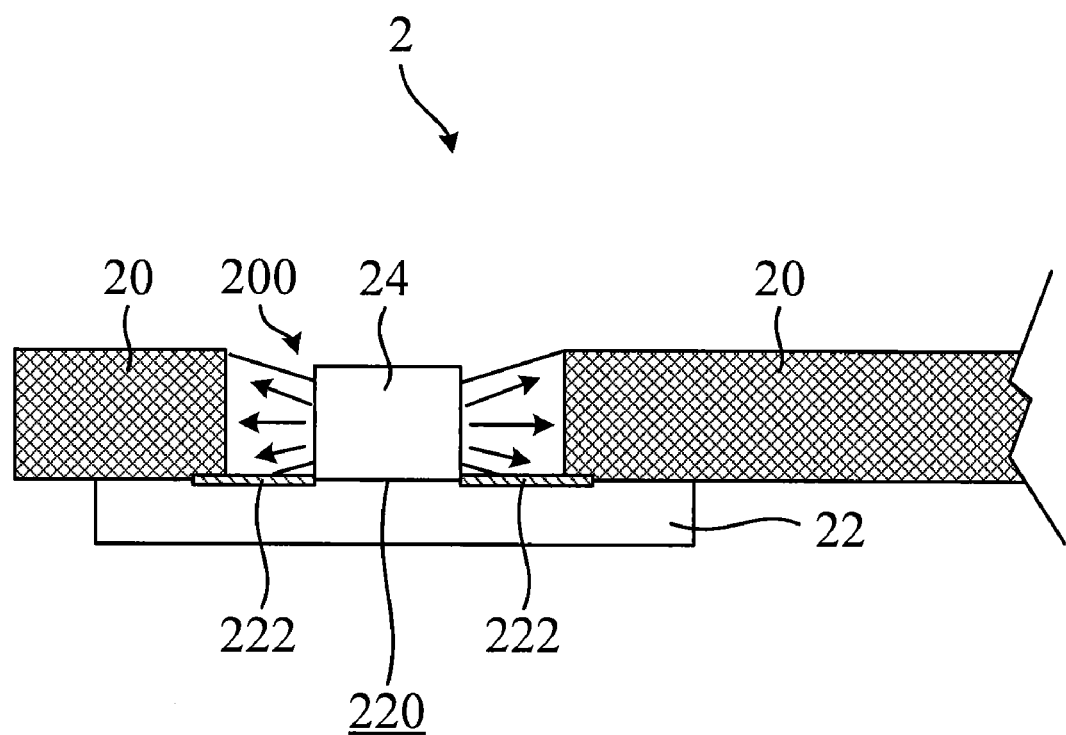
FIG. 2 is a partial view of a backlight module according to an embodiment of the invention.

Please refer to FIG. 2. FIG. 2 is a partial view of a backlight module 2 according to an embodiment of the invention. As shown in FIG. 2, the backlight module 2 of the invention includes a light guiding plate 20, a flexible substrate 22 and a light emitting unit 24. The light guiding plate 20 includes a space 200 for containing the light emitting unit 24. The light emitting unit 24 is simultaneously disposed on the first surface 220 of the flexible substrate 22. In practice, the backlight module 2 of the embodiment can be applied in a light-emitting keyboard as a light source.

A part of the light emitted from the light emitting unit 24 injects into the light guiding plate 20 directly, and a part of the light injects on the first surface 220 of the flexible substrate 22. In practice, the light emitting unit 24 can be, but not limited to, a light emitting diode. A paint area 222 is formed on the first surface 220 of the flexible substrate 22 near the light emitting unit 24. Moreover, the paint area 222 reflects the light emitted from the light emitting unit 24 to the light guiding plate 20.

Please not that there is only a light emitting unit 24 illustrated in the backlight module 2 of FIG. 2. However, in practice, the number and the position of the light emitting unit 24 can be changed depends on the demand of a user or a designer. Additionally, in practice, the paint area 222 of this embodiment can be formed on the first surface 220 near each of the light emitting units 24 for reflecting the light emitted from the light emitting units 24 to the light guiding plate 20.

Figure 3:
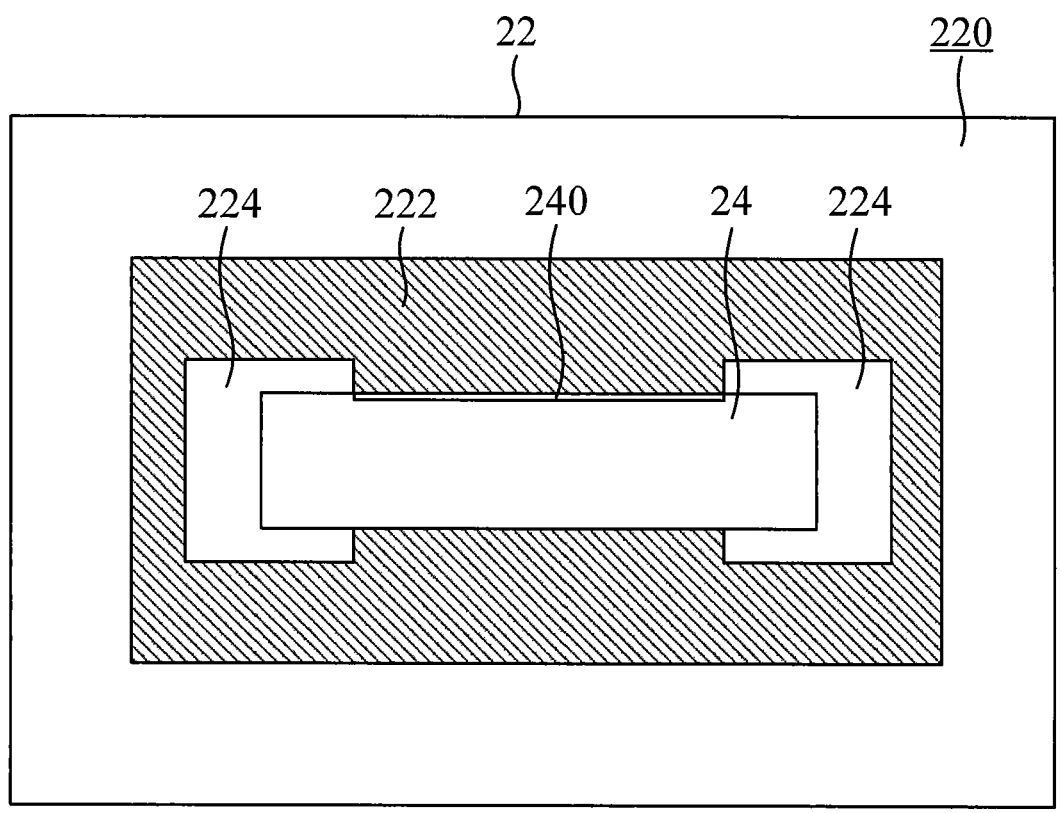
FIG. 3 is a top view of a light emitting unit disposed on a flexible substrate according to another embodiment of the invention.

Please refer to FIG. 3. FIG. 3 is a top view illustrating a light emitting unit 24 disposed on a flexible substrate 22 according to another embodiment of the invention. As shown in FIG. 3, both ends of the light emitting unit 24 are connected to the first surface 220 of the flexible substrate 22 via tabs 224. The paint area 222 is formed on the first surface 220 near the light emitting unit 24, especially near an outlet 240 of the light emitting unit 24, so as to reflect the light emitted from the outlet 240 of the light emitting unit 24 to the light guiding plate 20. Please note that the outlet 240 is disposed at one side of the light emitting unit 24 in the embodiment. However, in practice, the number and the position of the outlet 240 of the light emitting unit 24 can be changed depends on the demand of the user or the designer.

In the embodiment, a white material, for example, white paint or white ink, is used to paint on the first surface 220 to form the paint area 222. Because the paint area 222 is formed of said white material, the light emitted from the light emitting unit 24 can be completely reflected from the paint area 222 to the light guiding plate 20, and the light injected into the light guiding plate 20 has the same color, i.e., the color of the light emitted from the light emitting unit 24.

In another embodiment, the paint area 222 of the invention can be formed of a material with the same color of the light emitted from the light emitting unit 24. Accordingly, the color of the light reflected to the light guiding plate 20 will be the same as the color of the light emitted from the light emitting unit 24.

Figure 4:
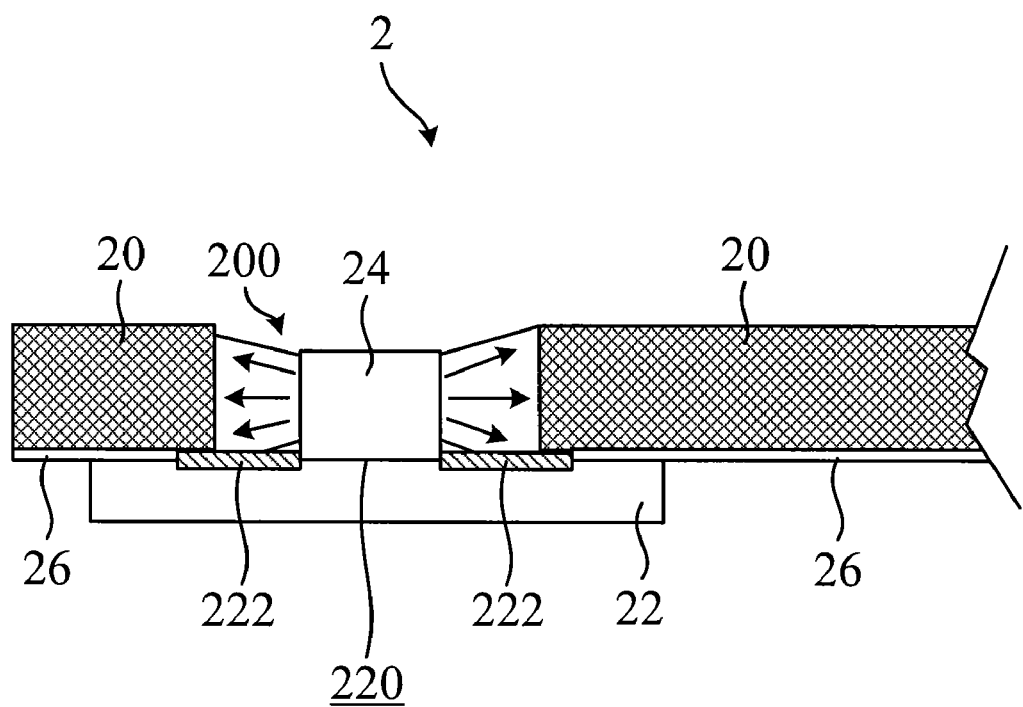
FIG. 4 is a partial view of a backlight module according to another embodiment of the invention.

Please refer to FIG. 4. FIG. 4 is a partial view of a backlight module 2 according to another embodiment of the invention. As shown in FIG. 4, the difference between this embodiment and the last one is that the backlight module 2 of this embodiment further includes a reflecting unit 26 disposed between the flexible substrate 22 and the light guiding plate 20.

In the embodiment, the reflecting unit 26 is a sheet, and the size of the sheet is substantially the same as the size of the light guiding plate 20. When the light in the light guiding plate 20 is transmitted to the reflecting unit 26, the reflecting unit 26 reflects the light back into the light guiding plate 20 to ensure the light continuously transmitted in the light guiding plate 20. Additionally, in practice, the reflecting unit 26 can be suitably designed to have different functions. For example, a reflecting patch can be pasted on the reflecting unit 26, so as to reflect the light in the light guiding plate 20 to another surface of the light guiding plate 20 to be a light source to the keyboard.

Additionally, a hole (not shown in FIG. 4) can be formed at the position on the reflecting unit 26 corresponding to the space 200. The light emitting unit 24 passes through the hole to be contained in the space 200. In practice, the number and the position of the hole correspond to the number and the position of the light emitting unit 24 to be disposed on the reflecting unit 26.

Figure 5:
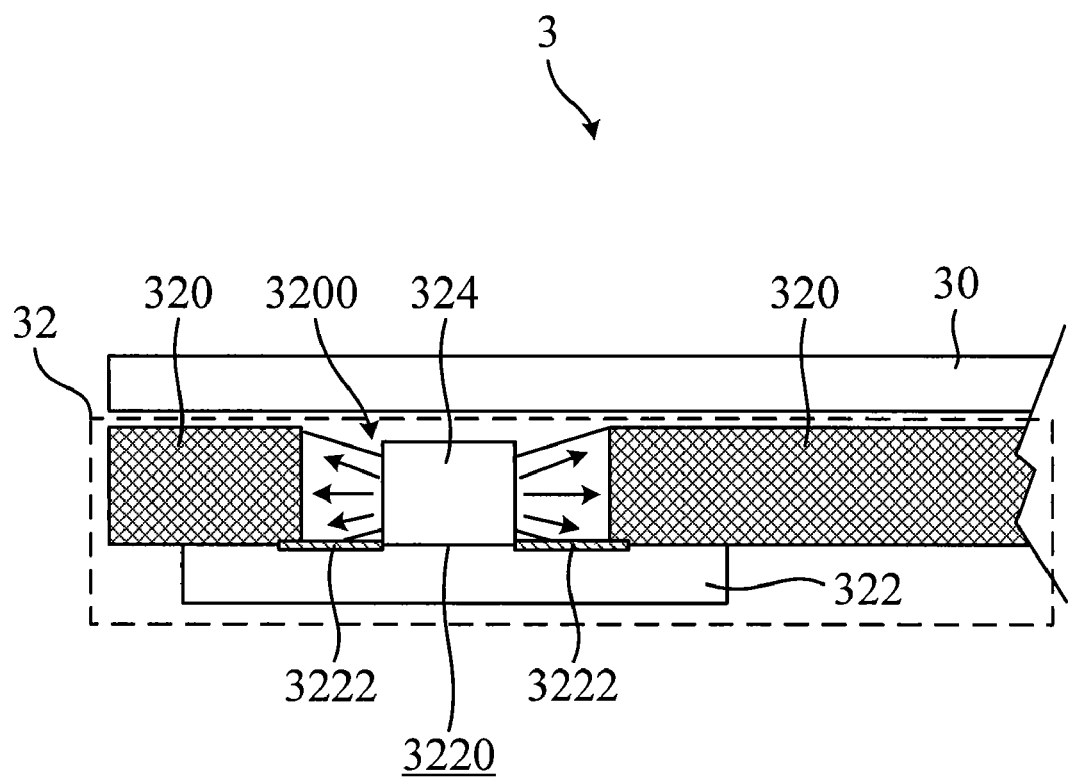
FIG. 5 is a partial view of a keyboard according to an embodiment of the invention.

Please refer to FIG. 5. FIG. 5 is a partial view of a keyboard 3 according to an embodiment of the invention. As shown in FIG. 5, the keyboard 3 includes a keyboard module 30 and a backlight module 32, wherein the backlight module 32 is disposed under the keyboard module 30 to provide a light source to the keyboard module 30.

In the embodiment, the backlight module 32 further comprises a light guiding plate 320, a flexible substrate 322 and a light emitting unit 324. The light guiding plate 320 is disposed under the keyboard module 30, wherein the light guiding plate 320 has a space 3200. The light emitting unit 324 is disposed on a first surface 3220 of the flexible substrate 322, and the light emitting unit 324 is contained in the space 3200.

A part of the light emitted from the light emitting unit 324 injects into the light guiding plate 320 directly, and a part of the light injects on the first surface 3220 of the flexible substrate 322. In practice, the light emitting unit 324 can be, but not limited to, a light emitting diode. A paint area 3222 is formed on the first surface 3220 of the flexible substrate 322 near the light emitting unit 324. Moreover, the paint area 3222 reflects the light emitted from the light emitting unit 324 to the light guiding plate 320.

In the embodiment, a white material, for example, white paint or white ink, is used to paint on the first surface 3220 to form the paint area 3222. Because the paint area 3222 is formed of said white material, the light emitted from the light emitting unit 324 can be completely reflected from the paint area 3222 to the light guiding plate 320, and the light injecting into the light guiding plate 320 has the same color, i.e., the color of the light emitted from the light emitting unit 324. In practice, the paint area 3222 of the invention can be formed of a material with the same color of the light emitted from the light emitting unit 324. Accordingly, the color of the light reflected to the light guiding plate 320 will be the same as the color of the light emitted from the light emitting unit 324.

As mentioned above, because the paint area 3222 covers the flexible substrate 322, the light emitted from the light emitting unit 324 can be completely reflected by the paint area 3222 to the light guiding plate 320. Practically, the color of the paint area 3222 can be white or the same color of the light emitted from the light emitting unit 324. Accordingly, the color of the light reflected by the paint area 3222 is the same as the color of the light injected directly from the light emitting unit 324 to the light guiding plate 320, so as to solve the problem in the prior art.

According to another embodiment, the backlight module of the keyboard of the invention further includes a reflecting unit disposed between the light guiding plate and the flexible substrate. In the embodiment, the reflecting unit is a sheet and the size of the sheet is substantially the same as the size of the light guiding plate or the keyboard. When the light in the light guiding plate is transmitted to the reflecting unit, the reflecting unit reflects the light back into the light guiding plate to ensure the light continuously transmitted in the light guiding plate. Additionally, in practice, the reflecting unit can be suitably designed to have different functions. For example, a reflecting patch can be pasted on the reflecting unit, so as to reflect the light in the light guiding plate to another surface of the light guiding plate to be a light source to the keyboard.

In the embodiment, a hole can be formed at the position on the reflecting unit corresponding to the space. The light emitting unit passes through the hole to be contained in the space. In practice, the number and the position of the hole correspond to the number and the position of the light emitting unit to be disposed on the reflecting unit.

Compared to the prior art, a paint area is formed on the surface of the flexible substrate of the backlight module of the invention near the light emitting unit. The paint area reflects the light emitted from the light emitting unit to the light guiding plate to ensure the light continuously transmitted in the light guiding plate. The paint area is formed by painting a material on the surface of the flexible substrate, wherein the material is a white material, such as white paint or white ink, or the material has the same color as the light emitted from the light emitting unit. Therefore, the paint area can completely reflect the light emitted from the light emitting unit to the light guiding plate. The color of the light injected into the light guiding plate is the same as the color of the light emitted from the light emitting unit, so as to improve the disadvantage of the prior art.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A backlight module comprising:
    a light guiding plate;
    a flexible substrate, having a first surface; and
    a light emitting unit, disposed on the first surface;
    wherein a paint area is formed on the first surface near the light emitting unit for reflecting the light emitted from the light emitting unit to the light guiding plate.

2. The backlight module of claim 1, wherein the light guiding plate further comprises a space for containing the light emitting unit.

3. The backlight module of claim 2, further comprising a reflecting unit disposed between the light guiding plate and the flexible substrate, wherein the reflecting unit has a hole corresponds to the space.

4. The backlight module of claim 3, wherein the reflecting unit is a sheet and the size of the sheet is substantially the same as the size of the light guiding plate.

5. The backlight module of claim 3, wherein the light emitting unit passes through the hole to be contained in the space.

6. The backlight module of claim 1, wherein the paint area is formed on the first surface near an outlet of the light emitting unit, so as to reflect the light emitted from the outlet of the light emitting unit to the light guiding plate.

7. The backlight module of claim 1, wherein the paint area is formed of a white material.

8. The backlight module of claim 7, wherein the white material is white paint or white ink.

9. The backlight module of claim 1, wherein the paint area is formed of a material with the same color of the light emitted from the light emitting unit.

10. The backlight module of claim 1, wherein the light emitting unit is a light emitting diode.

11. A keyboard comprising:
    a keyboard module; and
    a backlight module disposed under the keyboard module, and the backlight module comprising:
        a light guiding plate disposed under the keyboard module, and the light guiding plate having a space;
        a flexible substrate disposed under the light guiding plate, and the flexible substrate having a first surface; and
        a light emitting unit disposed on the first surface and contained in the space;
    wherein a paint area is formed on the first surface near the light emitting unit for reflecting the light emitted from the light emitting unit to the light guiding plate.

12. The keyboard of claim 11, further comprising a reflecting unit disposed between the light guiding plate and the flexible substrate, wherein the reflecting unit has a hole corresponds to the space.

13. The keyboard of claim 12, wherein the reflecting unit is a sheet and the size of the sheet is substantially the same as the size of the keyboard.

14. The keyboard of claim 12, wherein the light emitting unit passes through the hole to be contained in the space.

15. The keyboard of claim 11, wherein the paint area is formed on the first surface near an outlet of the light emitting unit, so as to reflect the light emitted from the outlet of the light emitting unit to the light guiding plate.

16. The keyboard of claim 11, wherein the paint area is formed of a white material.

17. The keyboard of claim 16, wherein the white material is white paint or white ink.

18. The keyboard of claim 11, wherein the paint area is formed of a material with the same color of the light emitted from the light emitting unit.

19. The keyboard of claim 11, wherein the light emitting unit is a light emitting diode.

* * * * *